United States Patent [19]

Yamashita et al.

[11] Patent Number: 5,025,437
[45] Date of Patent: Jun. 18, 1991

[54] INTERLOCKING BRAKING AND LOCK MECHANISMS FOR SCANNING APPARATUS OF AN INFORMATION PROCESSING SYSTEM

[75] Inventors: Hiroshi Yamashita, Kawasaki; Yoshiaki Tago; Tomohisa Yoshimaru, both of Yokohama, all of Japan

[73] Assignee: Kabushiki Kaisha Toshiba, Kawasaki, Japan

[21] Appl. No.: 306,715

[22] Filed: Feb. 6, 1989

[30] Foreign Application Priority Data

Feb. 8, 1988 [JP] Japan .................................. 63-26792

[51] Int. Cl.⁵ .............................................. G11B 5/54
[52] U.S. Cl. .................................... 369/79; 360/74.1; 360/75; 360/105
[58] Field of Search ............... 360/71, 74.1, 75, 78.04, 360/86, 96.5, 97, 105, 107; 369/79

[56] References Cited

U.S. PATENT DOCUMENTS

| | | | |
|---|---|---|---|
| 4,131,922 | 12/1978 | Yoshida et al. | 360/105 X |
| 4,139,874 | 2/1979 | Shiraishi . | |
| 4,399,475 | 8/1983 | Shimomae | 360/105 X |
| 4,417,288 | 11/1983 | Hattori et al. | 360/74.1 |
| 4,452,409 | 6/1984 | Takai | 360/74.1 X |
| 4,470,087 | 9/1984 | Sakamoto et al. | 360/75 X |
| 4,497,002 | 1/1985 | von der Heide et al. | 360/86 X |
| 4,725,907 | 2/1988 | Jue | 360/105 |
| 4,764,831 | 8/1988 | Patel | 360/105 |
| 4,796,130 | 1/1989 | Shimanuki | 360/105 |
| 4,807,061 | 2/1989 | Yoon | 360/74.1 |
| 4,807,071 | 2/1989 | Kosaka et al. | 360/105 |
| 4,833,550 | 5/1989 | Takizawa et al. | 360/75 |
| 4,899,951 | 2/1990 | Okada et al. | 360/74.1 |

FOREIGN PATENT DOCUMENTS

3719596A1 12/1987 Fed. Rep. of Germany .

OTHER PUBLICATIONS

European Search Report No. EP 89 10 2017 at The Hague on Nov. 13, 1989.
Patent Abstracts of Japan, vol. 4, No. 146, Oct. 1980, Abstracting JP-A-55-93568.
Patent Abstracts of Japan, vol. 11, No. 29, Jan. 1987, Abstracting JP-A-61-199269.
Patent Abstracts of Japan, vol. 6, No. 188, Sep. 1982, Abstracting JP-A-57-98161.
Patent Abstracts of Japan, vol. 7, No. 127, Jun. 1983, Abstracting JP-A-58-45670.

*Primary Examiner*—Paul Ip
*Attorney, Agent, or Firm*—Finnegan, Henderson, Farabow, Garrett and Dunner

[57] ABSTRACT

An information processing system has a scanning apparatus which includes a brake mechanism for braking a turntable, on which an optical disk is mounted when the motor for rotating the turntable is stopped. A lock mechanism for preventing the optical head from moving is also activated. The lock mechanism operates in interlock with the brake mechanism when the brake mechanism is activated. The brake and lock mechanism are driven by a common drive source.

10 Claims, 3 Drawing Sheets

INTERLOCKING BRAKING AND LOCK MECHANISMS FOR SCANNING APPARATUS OF AN INFORMATION PROCESSING SYSTEM

BACKGROUND OF THE INVENTION

1. Field of the Invention

The present invention relates to scanning or tracking apparatus used for information processing, such as recording or reproduction of information on or from an information memory disk, such as an optical disk.

2. Description of the Related Art

Many information processing systems use an optical disk as an information memory medium. Compared with magnetic information processing systems which were previously used, disk processing systems have the following features or advantages:

The information memory capacity can be increased considerably, and stable information processing can be accomplished with less noise. During the information processing operation, moreover, there is no contact between the memory medium and the optical head, so that the possibility of damage is reduced. Because of these advantages, disk processing systems are widely used.

In one such information processing apparatus, the optical disk is rotated on a turntable and the optical head is moved in the radial direction of the disk while directed at a specified track of the disk. On the selected track, the optical head records or reproduces information on or from the disk. In order to prevent the optical head from being damaged by vibration during transportation, a lock mechanism is sometimes used. The lock mechanism is used to fix the head at a predetermined position during transportation. Also a brake mechanism may be used to shorten the step period of the turntable.

Conventionally, however, the lock and the brake are separate mechanisms. Therefore, the processing system must be provided with separate drive sources or components for these two mechanisms, so that it has a complicated construction, and entails high manufacturing costs. Furthermore, these mechanisms require substantial installation space, thus resulting in an increase in the size of the system.

SUMMARY OF THE INVENTION

The present invention has been conceived in consideration of these factors, and its object is to provide a compact information processing apparatus with a simple construction, in which recording means, such as an optical head, can be locked in place while the system is inoperative, and the period for stopping the turntable can be shortened.

In order to achieve the above object, an information processing apparatus according to the present invention is constructed so that a brake mechanism and a lock mechanism are interlocked, and driven by a common drive source.

Thus, according to the present invention, there is provided a compact apparatus which does not require the use of separate drives for the lock mechanism and the brake mechanism and, as a consequence, is simpler to construct.

BRIEF DESCRIPTION OF THE DRAWINGS

FIGS. 1 to 5 show an information processing apparatus according to an embodiment of the present invention, in which:

FIG. 1 is a perspective view showing an information processing system and a recording medium cartridge used therewith;

FIG. 2 is a perspective view of the system showing a drive mechanism and an optical head;

FIG. 3 is a plan view showing a brake mechanism and a lock mechanism in an operative state;

FIG. 4 is a plan view showing the brake mechanism and the lock mechanism in a nonoperative state; and FIG. 5 is a block diagram of a control device.

DETAILED DESCRIPTION OF THE PREFERRED EMBODIMENT

An embodiment of the present invention will now be described in detail with reference to the accompanying drawings.

Figure 1:
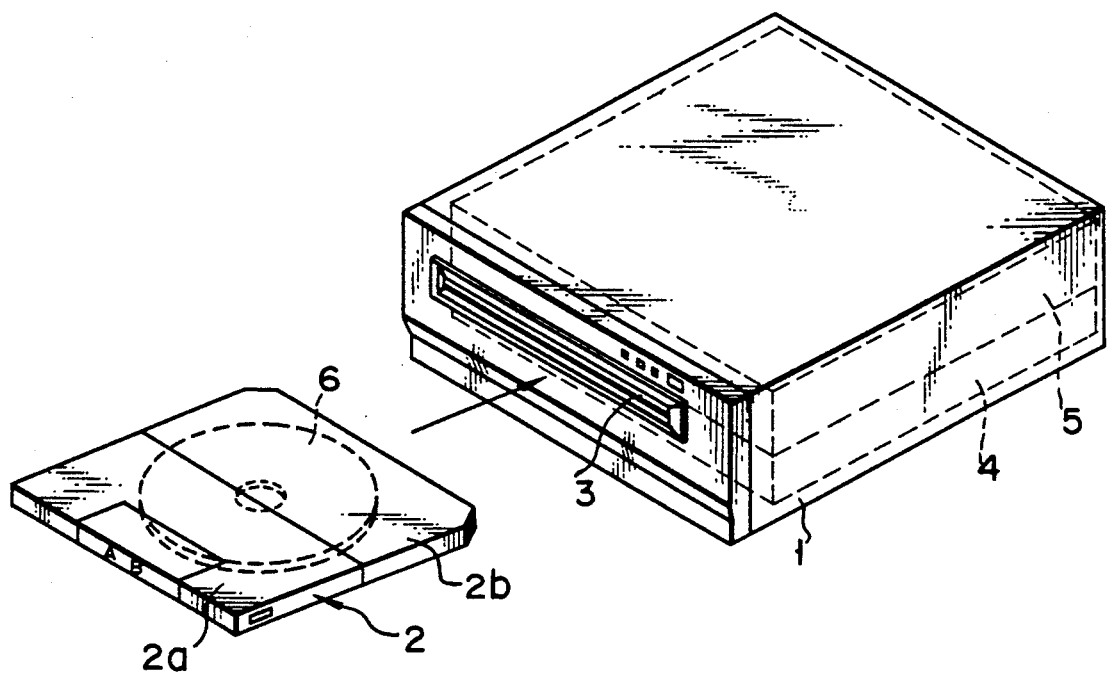

FIG. 1 shows an information processing system according to the present invention and cartridge 2 for use therewith.

The processing system includes casing 1 which has cartridge slot 3 on the upper portion of its front face, through which cartridge 2 is inserted into casing 1 of the processing apparatus through cartridge slot 3 and is automatically loaded in a predetermined horizontal position by loading mechanism 5. During loading cartridge 2 is opened at 2a and 2b to expose the central portion of rotation of disk 6. Thereafter, cartridge 2 horizontally shifts its position, allowing disk 6 to be mounted on a turntable (described later).

Figure 2:
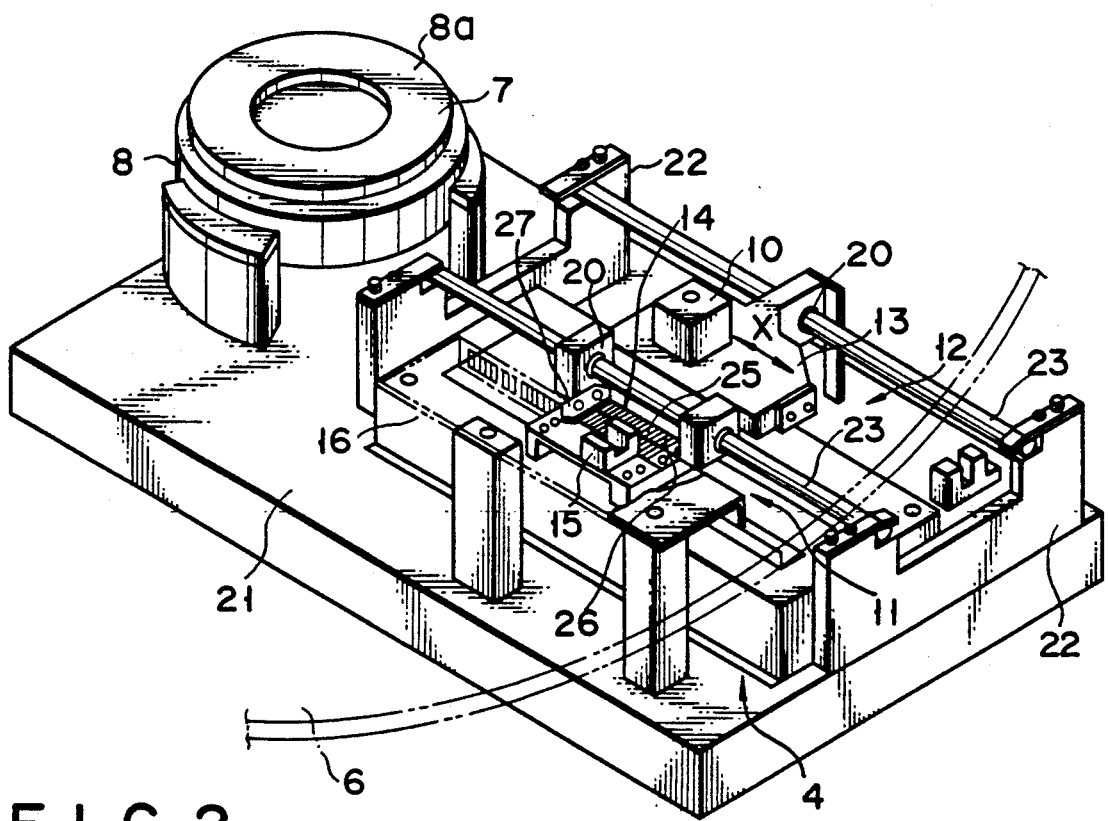

As is shown in FIG. 2, drive base mechanism 4 includes spindle motor 8 for use as disk drive means, optical head 10 as scanning (reading/recording) means, and head drive unit 11 for moving the optical head in the radial direction of disk 6. All of these components are mounted on base 21.

Motor 8, which is fixed on base 21 by means of a plurality of mounting posts, includes rotor 8a having an upper surface which serves as turntable 7 on which disk 6 is mounted.

Head drive unit 11 includes slider 13, linear motor 14, and detector 15. Slider 13, which carries optical head 10 thereon, is guided by means of guide mechanism 12 (described later) for reciprocation in the radial direction of disk 6. Motor 14 moves slider 13 along guide mechanism 12 in coordination with rotation of disk 6 so that head 10 faces a specified track on the recording surface of the disk. Detector 15 serves to detect the position of the slider.

Guide mechanism 12 includes a pair of support plates 22, which are set up on base 21 parallel to each other, and a pair of guide shafts 23 which extend in the radial direction of disk 6 between the support plates. Opposite end portions of each shaft 23 are supported by their corresponding support plates 22. Shafts 23 penetrates a plurality of bearings 20 embedded in slider 13.

Linear motor 14 includes bobbin 26 and magnet 16. Bobbin 26 is coupled to slider 13 by means of arms 27, and is wound with coil 25. Magnet 16 is located on base 21 facing the bobbin. When coil 25 is energized, slider 13 is reciprocated integral with bobbin 25, in the direction of arrow X, i.e., in the radial direction of disk 6.

Figure 3:
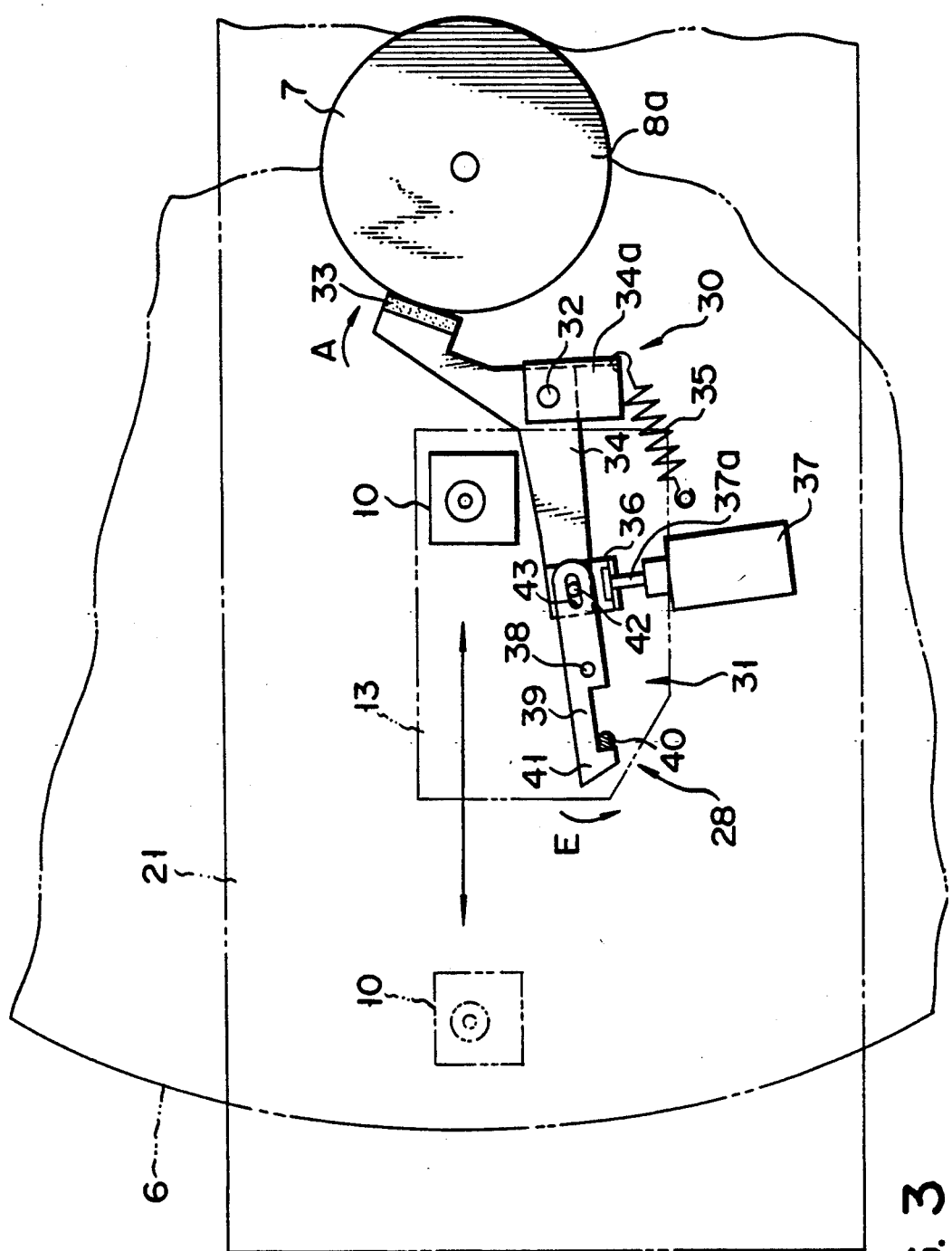

Base 21 of drive base mechanism 4 is mounted with brake mechanism 30, lock mechanism 31, and solenoid 37, as is shown in FIG. 3. Brake mechanism 30 is used to brake turntable 7 when the operation of spindle motor 8 is stopped. Lock mechanism 31 prevents the movement of slider 13 with head 10 mounted thereon, while information on the disk is not being scanned. Solenoid 37 serves as a single drive source for operating these mechanisms, the lock and brake mechanisms.

Figure 4:
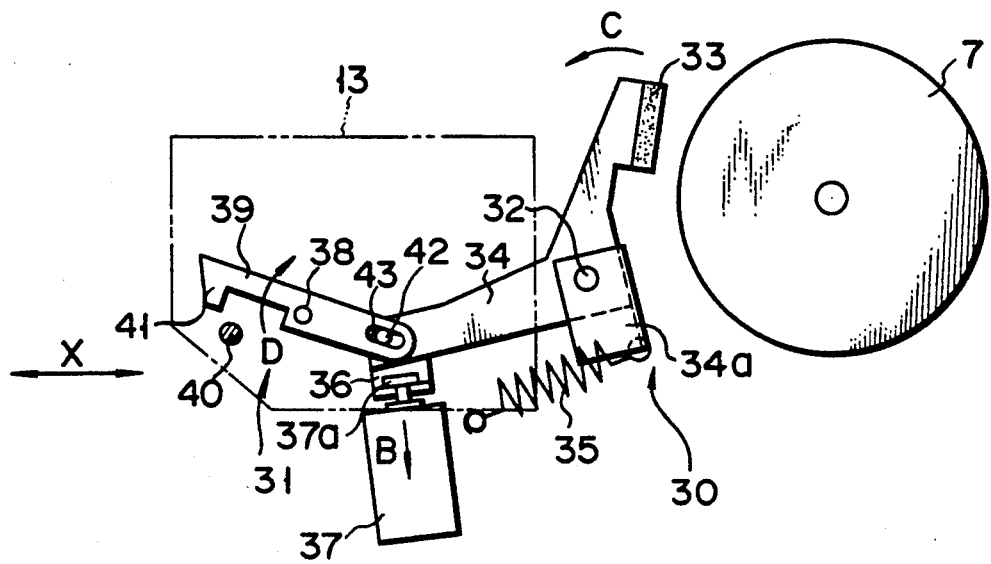

Brake mechanism 30 includes brake lever 34, the middle portion of which is rockably mounted on base 21 by means of pivot 32. Brake pad 33 formed of a high-friction material, such as rubber, is attached to one end of lever 34. Tension spring 35 is stretched between base 21 and coupling portion 34a which is fixed to the middle portion of lever 34. Lever 34 is urged to rock clockwise or in the direction of arrow A around pivot 32 by spring 35. Thus, brake pad 33 is pressed against the outer peripheral surface of turntable 7 by the urging force of spring 35, so that the turntable is braked by the friction between the pad and the turntable. The other end of brake lever 34 is coupled to plunger 37a of self-hold solenoid 37 through coupling member 36. When a positive pulsating current is applied to solenoid 37, plunger 37a is withdrawn in the direction of arrow B by the solenoid, as is shown in FIG. 4. Thereupon, lever 34 is rocked counterclockwise or in the direction of arrow C, against the urging force of spring 35, so that brake pad 33 is separated from turntable 7. Thus, turntable 7 is allowed to rotate freely.

As is shown in FIG. 3, lock mechanism 31 includes retaining lever 39, the middle portion of which is rockably mounted on base 21 by means of pivot 38. Hook 41, which is formed at one end of lever 39, constitutes retaining portion 28 capable of engaging pin 40 which protrudes toward base 21 from the bottom of slider 13, with optical head 10 mounted thereon. In FIGS. 3 and 4, slider 13 is indicated by two-dot chain line. Hook 41 engages pin 40 and prevents slider 13 from moving. Slot 43 is formed at the other end of lever 39. Engaging pin 42 protruding from the other end of brake lever 34 is fitted in slot 43. Thus, retaining lever 39 is adapted to be rocked in association with lever 34.

Figure 5:
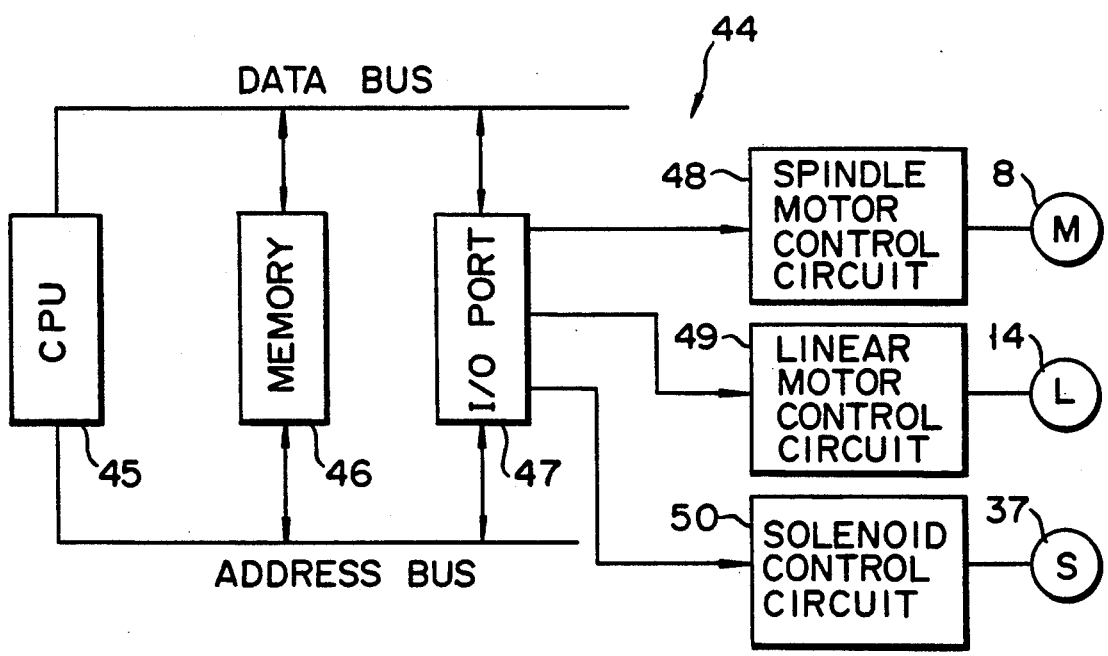

The information processing apparatus comprises control device 44 for controlling the operations of spindle motor 8, linear motor 14, and solenoid 37. As is shown in FIG. 5, control device 44 includes CPU 45, memory (ROM) 46, I/O port 47, spindle motor drive circuit 48, linear motor control circuit 49, and solenoid control circuit 50. A series of sequence commands, including drive commands for motors 8 and 14 and solenoid 37, are programmed and stored beforehand in memory 46. CPU 45 processes data while fetching necessary external data from I/O port 47 in accordance with the sequence commands, or giving to and receiving data from memory 46. CPU 45 delivers, as required, the processed data as the sequence commands to port 47. At these sequence commands are executed in succession, sequence control is effected to brake spindle motor 8.

The following is a description of the operation of the information processing apparatus made in accordance with the present invention.

When the rotating turntable 7 is stopped, to interrupt the scanning operation, spindle motor 8 is first electrically braked by means of control device 44 so that the rotation of the turntable is switched from a high-speed mode to a low-speed mode. At the same time, control device 44 drives linear motor 14, thereby moving slider 13 so that optical head 10 is opposed to the innermost peripheral position of disk 6, i.e., a rest position. When turntable 7 is switched to the low-speed mode, the drive of spindle motor 8 is stopped. At the same time, a negative pulsating current is applied to solenoid 37, thereby releasing the self-holding force of the solenoid. Thereupon, brake lever 34 of brake mechanism 30 is urged to rock in the direction of arrow A by spring 35, so that brake pad 33 reaches its operating position where it is pressed against turntable 7. Turntable 7 is braked and stopped by the pressure of pad 33. Also retaining lever 39 of lock mechanism 31, which is coupled to brake lever 34, rocks in the direction of arrow E in association with lever 34, thereby reaching its operating position where it engages pin 40 of slider 13. At this time, optical head 10, along with pin 40, is already moved to the innermost peripheral position of disk 6, so that hook 41 of lever 39 engages pin 40, as is shown in FIG. 3. In this manner, lever 39 prevents slider 13, with head 10 thereon, from moving toward the outer periphery of disk 6. Slider 13 is prevented from moving toward the inner periphery of disk 6 by an inside stopper (not shown). Thus, optical head 10 is locked to the innermost peripheral position of disk 6.

During restarting of the information processing system, solenoid 37 is turned on to release the braking and locking operations. When the positive pulsating current is applied to solenoid 37, plunger 37a is withdrawn in the direction of arrow B by the solenoid. Thereupon, brake lever 34 rocks in the direction of arrow C, against the urging force of spring 35, as is shown in FIG. 4, thereby reaching its nonoperating position where brake pad 33 is disengaged from turntable 7. Turntable 7 is thereby allowed to rotate freely.

At the same time, retaining lever 39 of lock mechanism 31 rocks in the direction of arrow D in association with the rocking movement of brake lever 34, thereby reaching its nonoperating position where hook 41 is disengaged from pin 40. Accordingly, slider 13 is unlocked, so that optical head 10 is allowed to move in the direction of arrow X, i.e., to track the desired track of disk 6.

According to the information processing system of the present invention, brake mechanism 30 can be used to brake turntable 7, thereby shortening the period for stopping the turntable. The use of lock mechanism 31, moreover, permits optical head 10 to be locked in a position at the innermost peripheral position of disk 6 when the apparatus is not in the information processing operation. Thus, head 10 can be kept immovable, so that it can be securely prevented from being damaged by vibration or impact during the transportation of the apparatus.

Brake lever 34 of brake mechanism 30 and retaining lever 39 of lock mechanism 31 are linked to each other for interlocked operation. Therefore, both these levers can be actuated by a single drive. Both brake and lock mechanism can be operated by means of common solenoid 37 without requiring two independent drive sources. Consequently, a compact processing apparatus is provided which requires fewer components and entails lower manufacturing costs.

According to the present embodiment, moreover, brake pad 33 is pressed against turntable 7 to stop it after spindle motor 8 is electrically braked to lower the rotation of the turntable from the high-speed mode to the low-speed mode in advance. Accordingly, brake mechanism 30 does not require a very great braking force, so that it can be of simple construction, and wear of pad 33 can be reduced. Thus, the apparatus of the present invention provides stable braking operation even after prolonged use.

It is to be understood that the present invention is not limited to the embodiment described above, and that various changes and modifications may be effected therein by one skilled in the art without departing from the scope or spirit of the invention.

For example, retaining lever 39 may be operated instead of operating brake lever 34 by means of solenoid 37. Moreover, the drive source is not limited to the combination of solenoid and plunger, and may be changed as required.

What is claimed is:

1. An apparatus for following a track on an optical information memory disk, comprising:
   first drive means, having a spindle motor, for rotating the memory disk;
   optical head means, adapted to be adjacent the memory disk when the rotating means is rotating the memory disk, for scanning the information on the memory disk;
   means for moving the optical head means in the radial direction of the memory disk, the moving means including a movable member movable in the radial direction of the memory disk, and the moving means supporting the optical head means, the movable member having an engagement portion;
   means for electrically braking the first device means to reduce the rotational speed of the spindle motor when the spindle motor power is cut off;
   means for mechanically braking the first drive means when the rotational speed is reduced;
   lock means for engaging the engagement portion to lock the movable member at a predetermined position when the mechanical braking means is operative to brake the first drive means; and
   second drive means for simultaneously driving both the mechanical braking means and the lock means.

2. An apparatus according to claim 1, wherein the engaging portion includes a projection protruding from the movable member, and the retaining portion includes a hook capable of engaging the projection.

3. An apparatus for following a track on an optical information memory disk, comprising:
   first drive means, having a spindle motor, for rotating the memory disk;
   optical head means, adapted to be adjacent the memory disk when the rotating means is rotating the memory disk, for scanning the information on the memory disk;
   means for moving the optical head means in the radial direction of the memory disk, the moving means including a movable member movable in the radial direction of the memory disk, and the moving means supporting the optical head means, the movable member having an engagement portion;
   means for braking the first drive means when the spindle motor power is cut off, the braking means having a first operating member rotatable between an operating position where it engages and brakes the first drive means and a nonoperating position where it is disengaged from the first drive means;
   means for locking the movable member at a predetermined position when the braking means is operative to brake the first drive means, the locking means having a second operating member rotatable between an operating position where it engages the engagement portion of the movable member located at the predetermined position to prevent the movable member from moving and a nonoperating position where it releases the movable member; and
   second drive means for simultaneously rotating both the first and second operating members between the operating position and the nonoperating position.

4. An apparatus according to claim 3, wherein the braking means includes a brake pad attached to the first operating member and adapted to be pressed against the first drive means when the first operating member is moved to the operating position thereof.

5. An apparatus according to claim 3, wherein the second operating member has a retaining portion for engaging the engagement portion of the movable member to prevent the movable member from moving, when the movable member is moved to a position where the optical head means is at the innermost peripheral portion of the disk, and when the second operating member is moved to the operating position.

6. An apparatus according to claim 3, wherein the first drive means includes a turntable coupled to the spindle motor and on which the memory disk may be mounted, and the first operating member has an end portion pressed against the turntable when the first operating member is rotated to the operating position.

7. An apparatus for following a track on an optical information memory disk, comprising:
   first drive means, having a spindle motor, for rotating the memory disk;
   optical head means, adapted to be adjacent the memory disk when the rotating means is rotating the memory disk, for scanning the information on the memory disk;
   means for moving the optical head means in the radial direction of the memory disk, the moving means including a movable member movable in the radial direction of the memory disk, and the moving means supporting the optical head means, the movable member having an engagement portion;
   means for electrically braking the first drive means to reduce the rotational speed of the spindle motor when the spindle motor power is cut off;
   means for mechanically braking the first drive means when the rotational speed is reduced, the braking means having a first operating member rotatable between an operating position where it engages and brakes the first drive means and a nonoperating position where it is disengaged from the first drive means;
   means for locking the movable member at a predetermined position when the mechanical braking means is operative to brake the first drive means, the locking means having a second operating member rotatable between an operating position where it engages the engagement portion of the movable member located at the predetermined position to prevent the movable member from moving and a nonoperating position where it releases the movable member;
   an urging member for simultaneously urging the first and second operating members to the operating position; and
   second drive means for simultaneously rotating both the first and second operating members to the nonoperating position.

8. An apparatus according to claim 7, wherein the second drive means is coupled to one of the first and second operating members.

9. The apparatus according to claim 7, wherein the first operating member has a first end, rockable between the operating and nonoperating positions and adapted to engage the first drive means when in the operating position, and a second end; the second operating member has a first end, rockable between the operating and nonoperating positions and adapted to prevent the movable member from moving when in the operating position, and a second end rockably connected to the second end of the first operating member, and the second drive means is coupled to the second end of one of the first and second operating member.

10. An apparatus according to claim 7, wherein the second drive means includes a solenoid mechanism for moving the first and second operating members to the nonoperating position when energized.

* * * * *